United States Patent [19]

Barasch

[11] 4,124,286
[45] Nov. 7, 1978

[54] METHOD AND APPARATUS FOR XEROGRAPHICALLY PRINTING A COMPOSITE RECORD OF FIXED AND VARIABLE DATA

[75] Inventor: Stephen Barasch, Southfield, Mich.
[73] Assignee: Burroughs Corporation, Detroit, Mich.
[21] Appl. No.: 825,592
[22] Filed: Aug. 18, 1977
[51] Int. Cl.² .................................... G03G 15/00
[52] U.S. Cl. .................................... 355/3 R; 96/1 R; 355/14; 355/40
[58] Field of Search ........ 355/3 R, 3 DR, 14, 40–43; 96/1 R; 101/DIG. 13; 346/153, 155, 160; 358/300

[56] References Cited

U.S. PATENT DOCUMENTS

| | | | |
|---|---|---|---|
| 3,659,936 | 5/1972 | Klose et al. | 355/3 R |
| 3,744,899 | 7/1973 | Sable | 355/14 |
| 3,768,904 | 10/1973 | Rodek | 355/14 X |
| 3,918,971 | 11/1975 | Zweig | 355/3 R |

Primary Examiner—Richard L. Moses
Attorney, Agent, or Firm—Carl Fissell, Jr.; Robert C. J. Tuttle; Kevin R. Peterson

[57] ABSTRACT

A method and apparatus for xerographically printing a composite record based on first and second complementary sources of information. The first source of information is imaged onto a photoconductive medium having the property of persistent conductivity to form a conductive image representative thereof. The conductive image is then transferred onto a second photoconductive medium in the form of a latent electrostatic image. The second, complementary source of information is imaged onto the second photoconductive medium, preferably by a scanning laser, as an overlay on the image of the first source. The composite electrostatic image so formed is then developed by the application of toner material and transferred onto a record medium.

20 Claims, 10 Drawing Figures

FIG. 4A.

Gotham City Bank

GOTHAM CITY, CA. 92049

Name

Address

Soc. Sec. No.

Acc't No.

Date   Deposit   Withdraw   Balance

Statement Date:

FIG. 4B.

JOHN R. DEPOSITER

122"A", SWING, CA.,
92049

987-65-432

123-567-8

8/21   100.00           100.00
8/31            50.00    50.00
9/19   300.00          350.00
9/20   Int. .25         350.25

Gotham City Bank

GOTHAM CITY, CA. 92049

Name JOHN R. DEPOSITER

Address 122"A", SWING, CA.,
92049

Soc. Sec. No. 987-65-432

Acc't No. 123-567-8

Date   Deposit   Withdraw   Balance
8/21   100.00              100.00
8/31             50.00      50.00
9/19   300.00              350.00
9/20   Int. .25             350.25

Statement Date: 9/20/79

METHOD AND APPARATUS FOR XEROGRAPHICALLY PRINTING A COMPOSITE RECORD OF FIXED AND VARIABLE DATA

BACKGROUND OF THE INVENTION

1. Field of the Invention

The present invention relates to the xerographic printing art, and more particularly to a method and apparatus for printing a composite record based on or derived from first and second complementary sources of information.

2. Description of the Prior Art

In the most common form of xerographic printing process, a document or record is imaged onto a photoconductor to which has been applied a uniform electrostatic charge. The incidence of the light pattern on the photoconductor causes those areas subjected to light energy to become electrically conductive and allow for the passage of charge to ground; those areas of the photoconductor not exposed to light energy remain electrically insulative and retain their electrostatic charge distribution. The net effect of the imaging process is to create a latent electrostatic image of the document or record. This electrostatic image may then be developed by the application of toner material. The developed image can then be transferred from the photoconductive surface onto a record medium.

The xerographic printing process just described is regarded as a simple positive-to-positive transfer of an original document. More specifically, black areas on the original document will be represented by an electrostatic charge pattern, and white areas will be represented by the absence of electrostatic charge. Stated otherwise, the absence of light in an image pattern represents information, and the presence of light represents non-information or is without informational significance. This relationship is well suited to a xerographic reproduction process for the copying of an original document. Positive printing can be reversed by use of a negative original but this usually requires a secondary process to make the negative original.

Moreover, the information to be xerographically printed may take an alternative embodiment other than an original document. For example, the information may be imaged by means of a scanning laser whose output is modulated in accordance with the flow of information. This particular embodiment is well adapted to interface a digital computer with a xerographic printer. In these instances, a latent electrostatic image may be formed in the negative mode to accommodate the laser, i.e. the presence of light will now signify information, and the absence of light will signify the absence of information. The formation and processing of negative latent electrostatic images is known in the art and is not novel in itself.

However, one can envision a system where it is advantageous to have the capability to xerographically print, both individually or jointly, information derived from an original positive document and information derived from a second source, such as a central processing unit interfacing to the xerographic printer through a negative mode laser. A printer system incorporating both of these features must make accommodation for the inherently conflicting characteristics of printing from an original positive document combined with printing from a negative mode laser output. Put more specifically, printing from an original positive document connotes a positive mode electrostatic image; and printing from a scanning light source such as a laser connotes a negative mode electrostatic image.

A good example of where one may want to combine the xerographic reproduction of an original document with the xerographic printing of computer generated data is in an accounting environment where periodically reports of several various accounts must be generated. Each account report may contain recurring information that may be regarded as fixed data, together with specific non-recurring information peculiar to that individual account that may be regarded as variable data. A practical example would be a monthly statement prepared by a bank and sent out to its savings account customers. The heading and format information would represent the fixed data, and the account information containing the depositor's name, account number, dates and amounts of transactions, etc. would represent the variable data. A xerographic printing system containing the capability to print a composite record containing both the fixed and variable data would be very advantageous in this environment.

It is the principal objective of the present invention to provide a xerographic copying system that incorporates the capability of printing both fixed positive image data along with variable data onto a single composite record.

SUMMARY OF THE INVENTION

The present invention is a method and associated apparatus for xerographically printing a composite record based or derived from two complementary sources of information. The first informational source may take the form of fixed data, such as an original positive document. The second source of information may take the form of variable data, and may be transmitted by a modulted light source, such as a laser.

In general, information from the first source is imaged onto a first photoconductive receiving medium having the property of persistent conductivity. More specifically, when a light pattern is incident upon the first photoconductive medium, those areas of the medium exposed to light energy will become electrically conductive and remain in that state for a relatively extended period of time; those areas of the medium not exposed to light energy will remain normally electrically insulative. This manner of imaging allows the first photoreceptive medium to capture a conductive image of the first informational source.

The first photoconductive medium bearing the conductive image is then brought into intimate relationship with a second photoconductive medium. An electrical potential of sufficient magnitude to cause charge transfer is applied across the first and second photoconductive media. The media then are separated, and at a certain critical point in the separation, air break-down occurs and a discharge current flows from the surface pattern on the first medium representing the conductive image to corresponding areas on the surface of the second medium. The effect of this process is to transfer and transform the conductive image borne by the first photoconductive medium onto the second photoconductive medium in the form of a negative latent electrostatic image.

This negative latent electrostatic image is acted on by the second informational source, as represented by the modulated output of a laser or similar type source of light energy. The incidence of light energy onto the negative latent electrostatic image causes the conduction of static charge to ground in those areas exposed to light. This effectively provides a method of writing or overlaying the second source of information onto the first source of information. The result is a composite electrostatic image of the first and second informational sources.

This conposite image may then be developed by the application of negative toner material as is available in the art. The developed image may then be transferred or removed from the second photoconductive medium onto a record medium to accomplish the objective set forth.

Other advantages of the present invention will be readily appreciated as the same becomes better understood by reference to the following detailed description when considered in connection with the accompanying drawings.

BRIEF DESCRIPTION OF THE DRAWING

FIG. 4A is an example of fixed information from a first data source;

FIG. 4B is an example of variable information from a second data source;

FIG. 4C is a composite record of the fixed and variable data records of FIGS. 4A and 4B, respectively.

DETAILED DESCRIPTION OF A SPECIFIC EMBODIMENT

Figure 1:
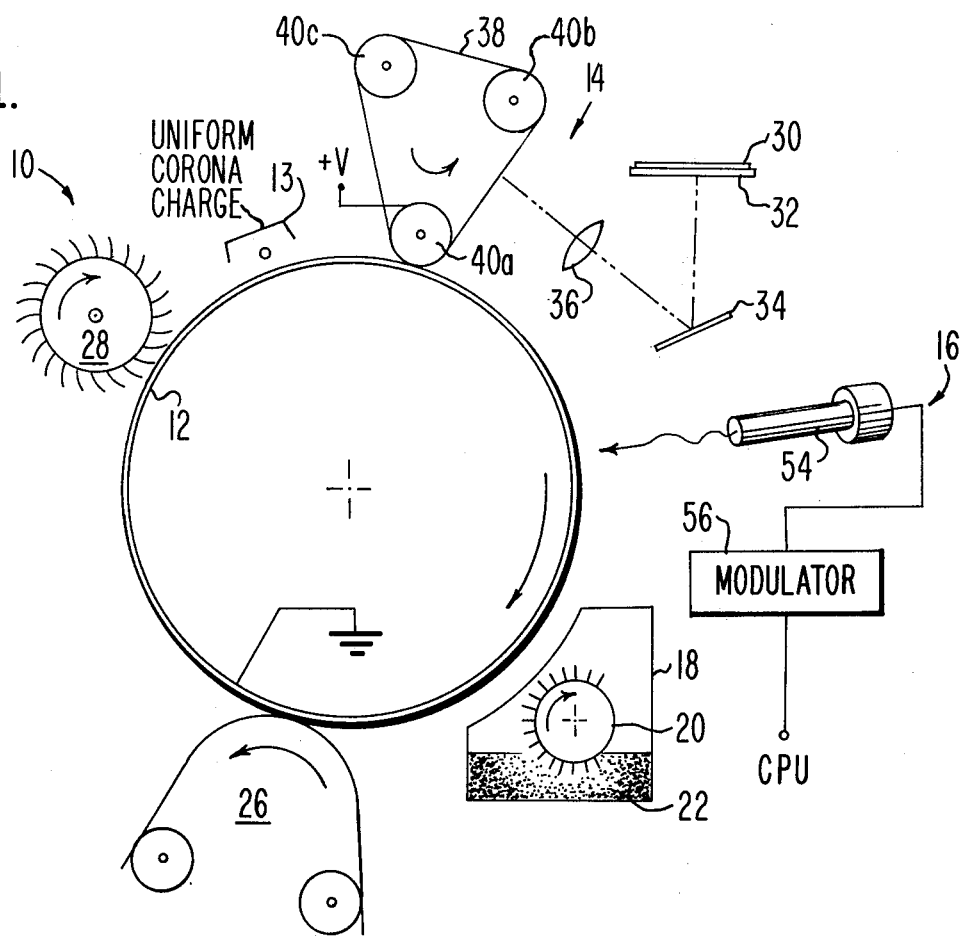
FIG. 1 is a schematic, overall representation of a xerographic printing system embodying the present invention.

FIG. 1 is a schematic representation of a xerographic printing system comprising the present invention. The system, generally indicated at 10, can be analytically broken down into a plurality of cooperative subsystems. Each subsystem will first be discussed in brief, with detailed attention then being given to those portions of the subsystems that are important to an understanding of the present invention.

The basic component of the system 10, with which all of the subsystems cooperate, is a cylindrical, photoconductive drum 12. The drum 12 represents the basic medium on which an image can be deposited, developed, and transferred from onto a record medium. The drum 12 may be of the common construction known in the xerographic printing art. More specifically, it preferably comprises a cylindrical aluminum rim having a photoconductive receiving layer on its surface. The photoconductive receiving layer may be, for example, a dispersion of selenium, selenium alloy, organic photoconductors, or cadmium sulfide in a resin binder. As is known in the art, the photoconductive surface is normally electrically insulative when in a dark environment, but will become electrically conductive wherever light energy is incident thereon. The drum 12 rotates in the direction indicated by the arrow by rotational drive means (not shown). The cylindrical aluminum substrate is maintained at ground potential as indicated in the drawing.

As is well understood, prior to imaging, a uniform charge field must be present on the photoconductive receiving layer. This may be obtained by means of a uniform corona charging assembly 13 as shown in FIG. 1.

The first subsystem to be described is a fixed data imaging station, generally indicated by reference numeral 14. As shall be hereinafter disclosed more fully, the present invention provides the capability for printing a composite record based on or derived from two complementary sources of information. In the most common practice of the invention, one of these informational sources represents fixed data, and the other informational source represents variable data. The fixed data imaging station 14 is most suitably adapted to the former function, i.e. providing a source of fixed graphic data, such as a letterhead, logograph, or other background information.

The next succeeding subsystem is a variable data imaging station, shown generally by reference numeral 16. The variable data imaging station represents the second, complementary informational source. The variable data is complementary in the sense that it can be overlaid with the fixed data on a document to form a composite record.

The next following subsystem is a developing station, shown generally at 18. The developing station 18 applies toner material to the composite latent electrostatic image formed on the drum 12 by the fixed data imaging station 14 and the variable data imaging station 16. The developing station 18 may, for example, employ a magnetic brush 20 for the application of toner material 22 onto the drum 12. Alternatively, any of various other toning techniques such as cascade, cloud, or the like may be selected for the practice of the present invention. The selection of the magnetic brush technique is intended only to be exemplary, and not limiting.

The next succeeding subsystem is an image transfer station, generally indicated at 26. The image transfer station removes the developed composite image from the drum 12 and transfers it onto a record medium, generally paper. Image transfer apparatus are well known in the art, and the choice of a particular apparatus or technique is not essential to the practice of the present invention.

The next following subsystem is the drum cleaning station, generally indicated at 28. The drum cleaning station is schematically represented as a cylindrical brush rotating in the same direction as the drum 12 so that its bristles will tend to brush the drum surface free of residual toner. Drum cleaning apparatus are well known in the art, and the selection of a particular drum cleaning apparatus or technique is not essential to the practice of the present invention.

Attention is now directed to the fixed data imaging station 14 which will presently be discussed in greater detail.

The fixed data imaging station includes a glass platen or similar type transparent surface 32 upon which an original document 30 may be disposed for imaging. The original document will bear what is regarded in terms of the present invention as fixed data. A practical example of a document containing such data is shown in FIG. 4A as the format or heading information for a periodic bank statement. Such information is the type that would recur on each statement to be printed. The graphic information on document 30 is optically transmitted by a mirror array 34 to a lens system 36. The lens 36 projects an image onto a photoconductive receiving medium in the form of an endless belt 38. The belt 38 is mounted on a group of cooperating rollers 40*a*, *b* and *c* in conveyor-like fashion. The rollers are driven in the direction of the arrow by rotational drive means (not shown). The lowermost drive roller 40*a* is positioned in intimate or contacting tangential relationship with the drum 12, and is maintained at an electrical potential, $+V$ relative to the drum. The potential $+V$ is of sufficient magnitude to cause charge transfer.

Figure 3A:
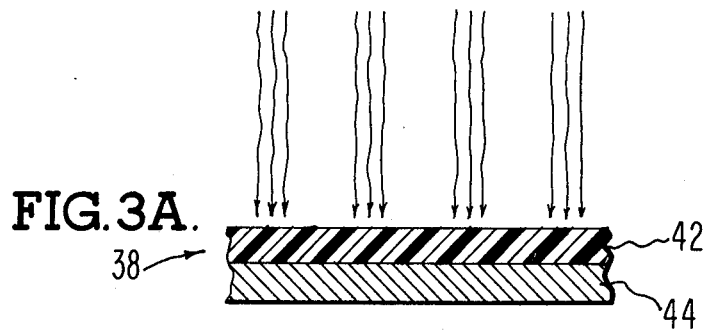
FIG. 3A is a schematic representation of the incidence of light energy onto the first photoconductive medium of FIG. 1 to form a conductive image.

Viewing now FIG. 3A, the endless belt comprising the photoconductive receiving medium is shown in partial cross section. The belt 38 comprises a base or substrate layer 44 formed of an electrically conductive material. A second, photoreceptive layer is formed from a photoconductive material having the property of presistent conductivity. A photoconductor characterized by a persistent conductivity has the capacity to remain electrically conductive in those areas where it has been impinged upon by light for an extended period after the light energy has been removed. This feature allows the light receiving surface to effectively form a conductive image of the light pattern incident thereon. In FIG. 3A, those areas of the photoconductive surface 42 receiving incident light energy will become conductive and remain conductive during the xerographic printing cycle to define a conductive image of the original document 30. The phenomenon of persistent conductivity and materials exhibiting this characteristic are more fully discussed in a volume by R. M. Schaffert, entitled *Electrophotography*, Ch IV, 2d Ed 1975, The Focal Press, New York.

Figure 3B:
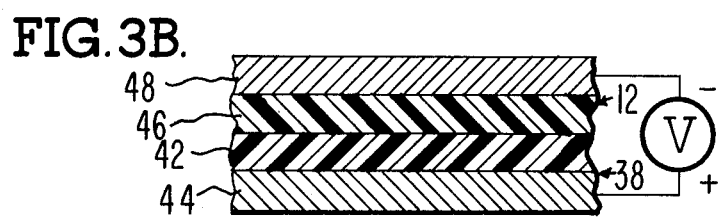
FIG. 3B illustrates the initial step in transferring and transforming the conductive image borne by the first photoconductive medium onto the second photoconductive medium of FIG. 1 and in the form of a corresponding latent electrostatic image.

Referring now to FIG. 3B, the portion of the endless belt 38 bearing the conductive image of the document 30 is transported around the roller assembly 40*a*, *b* and *c* until it comes into its most proximate relation with the drum 12. The drum 12, as was previously discussed, includes an aluminum base layer or substrate which is shown at 48, and an outer photoconductive layer, indicated by 46. At this point the transfer of the conductive image from the endless belt and its transformation into a corresponding latent electrostatic image on the drum 12 is initiated.

Figure 3C:
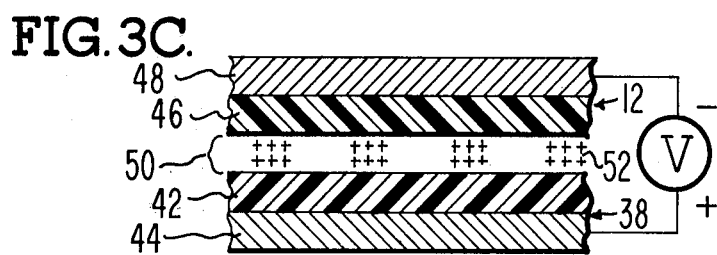
FIG. 3C schematically represents the transferring and transforming of the conductive image into a corresponding latent electrostatic image.

Referring now to FIG. 3C, as the corresponding surfaces on the endless belt 38 and drum 12 tend to separate as they continue their rotational paths, an air gap 50 is defined therebetween. At a critical point during separation, just prior to air breakdown, the presence of the electrical potential between substrata 44 and 48 cause a discharge current to flow across the air gap 50 from the conductive portions of photoconductive surface 42 to corresponding surface portions on photoconductor 46. The result is the effective transfer and transformation of the conductive image on the endless belt 38 into a latent electrostatic image on the photoconductive surface 46. It sould be noted that the image transfer has occurred in a positive-to-negative mode in accordance with xerographic printing art convention. However, the negative electrostatic image is used to advantage with the means employed with the variable data imaging station, as will hereinafter be discussed. Moreover, the availability of negative toner material makes the positive-negative mode distinction immaterial for purposes of developing the image.

The photoconductive surface 42 may thereafter have the conductive image removed therefrom by irradiation to infrared light or heat, as is known in the art.

Figure 5:
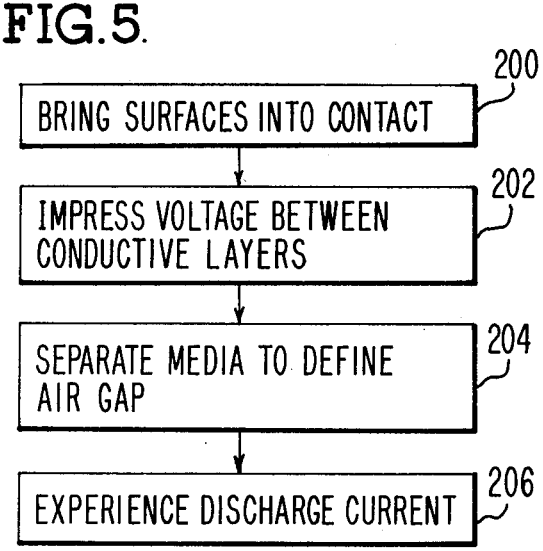
FIG. 5 is a flow chart illustrating the basic steps in the transfer and transformation of the conductive image from the first photoconductive medium onto the second photoconductive medium in the form of a corresponding latent electrostatic image.

The steps of the image transfer process are summarized by the block diagram of FIG. 5. First, in step 200, the surface bearing the conductive image is brought into contact or intimate relation with the surface to receive the latent electrostatic image. In step 202, a voltage of sufficient magnitude to cause breakdown in air is impressed across the conductive layer associated with the respective photoconductors. In step 204, the photoconductive media are separated to define an air gap. In step 206, when the separation reaches a critical distance, discharge current will occur allowing the conductive image to the transferred and transformed into a corresponding latent electrostatic image on the receiving surface. This technique of image transfer is related to the TESI (Transfer of Electrostatic Latent Images) process, which is discussed in full detail in R. M. Schaffert, *Electrophotography*, Ch 6, Sec 2, 2d Ed 1975, The Focal Press, New York.

Referring again to FIG. 1, the variable data imaging station 16 shall next be described in detail.

The function of the variable data imaging station is to image onto the drum 12 the variable data that complements the fixed data imaged by station 14. An example of such complementary type of variable data is represented by FIG. 4B. More specifically, contained therein is variable data which in conjunction with the fixed data of FIG. 4A, will comprise a complete bank statement, as represented by FIG. 4C. As can be seen by inspection, FIG. 4C is a composite image formed by the overlay of FIG. 4B on FIG. 4A.

The variable data imaging station 16 comprises a scanning laser unit 54 and an associated beam modulator 56. The modulator unit receives input from an informational source, which, for example, may be a central processing unit (CPU) and modulates the beam of the scanning laser 54 to define an image representing the input information. In the preferred embodiment, a helium neon (HeNe) laser having a wave length of 6300A is employed. Both the laser 54 and modulator 56 are commercially obtainable from Coherent Radiation, Palo Alto, Calif., 94304, and are designated Model 80-6S and Model 305, respectively.

The laser beam acts on the negative talent electrostatic image deposited on the drum 12 by imaging station 14 to cause the conduction of static charge to ground wherever the beam is incident upon the drum. In this manner the laser 54 effectively writes onto the drum 12 by causing the conduction of charge to ground in those areas which are to represent black indicia on the final printed text.

Figure 3D:
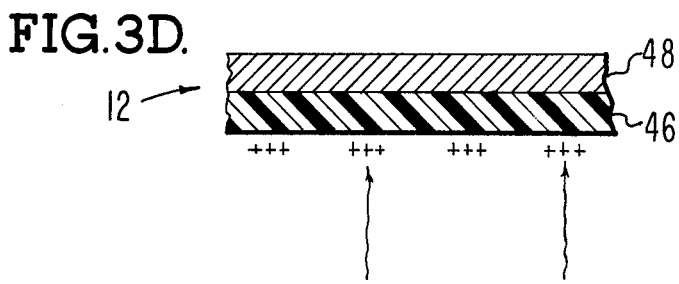
FIG. 3D is a schematic representation of the action of the laser beam on the negative latent electrostatic image on the drum.

FIG. 3D is a schematic representation of the phenomenon just described. More specifically, the incident laser energy is directed at the charge deposited on the drum 12 from the fixed data imaging station 14. This overlay of variable information onto fixed information creates an overall or composite negative electrostatic latent image containing both the fixed and variable data.

The composite image created by the processes just described is developed by the application of negative toner material at developing station 18. The application of negative toner material will translate the latent electrostatic image from the negative to the positive mode. Negative toning material is commercially available and known in the art.

Finally, the developed composite image is transferred from the drum 12 onto a record medium at transfer station 26. In the context of the present description, the transferred composite image would appear as the complete bank statement of FIG. 4C.

Figure 2:
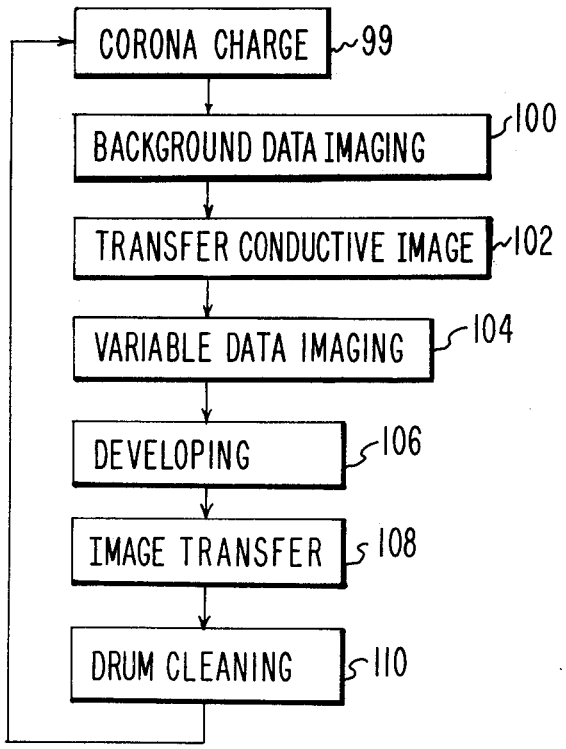
FIG. 2 is a flow chart of the basic steps involved in the complete operation of the xerographic printing system of FIG. 1.

The steps of the method as hereinafter described are summarized in the flow diagram of FIG. 2. First, the drum is subjected to the corona charge 99 to obtain a precharged photoconductor. Second, background data is provided by means of background data imaging 100. Third, the conductive image is next transferred by the transfer conductive image step 102. Fourth, variable data image 104 provides a variable data input to the fixed data already received. Fifth, the latent image thus created is developed in developing step 106. Sixth, the image now developed is next transferred, e.g. to paper for other utilization as at 108 and, finally, the step of drum cleaning 110 is accomplished to make ready for the next data input to the system apparatus.

The invention has been described in an illustrative manner, and it is to be understood that the terminology which has been used is intended to be in the nature of words of description rather than of limitation. Obviously, many modifications and variations of the present invention are possible in light of the above teachings. It is therefore to be understood that within the scope of the appended claims, the invention may be practiced otherwise than as specifically described.

The embodiments of the invention in which an exclusive property or privilege is claimed are defined as follows:

1. A method of xerographically printing a composite record of information derived from first and second complementary sources of information comprising the steps of:
(a) imaging a light pattern representative of the information from the first source onto a first photoreceptive medium, the first photoreceptive medium being formed of an electrically conductive base layer and a photoconductive receiving layer having the property of persistent conductivity, to form a conductive image of the information from the first source;
(b) transferring and transforming the conductive image from the first photoreceptive medium onto a second photoreceptive medium in the form of an electrostatic image of the conductive image, the second photoreceptive medium being formed of an electrically conductive base layer and a photoconductive receiving layer;
(c) imaging a light pattern representative of the information from the complementary second source onto the second photoreceptive medium to form a composite electrostatic image;
(d) developing the composite electrostatic image; and
(e) transferring the composite electrostatic image onto a record medium.

2. The method of claim 1, wherein the information from the second source is imaged onto the second photoreceptive medium by modulating the intensity of a scanning laser beam incident on the second photoreceptive medium.

3. The method of claim 1, wherein step (b) comprises the substeps of:
 i. bringing the photoconductive receiving layer of the first photoreceptive medium into intimate relation with the photoconductive receiving layer of the second photoreceptive medium;
 ii. impressing a voltage between the conductive layers associated with the first and second media, the voltage being of sufficient magnitude to cause breakdown in air; and
 iii. separating the first and second media to define an air gap for the flow of discharge current from the photoconductive receiving layer of the first medium to the photoconductive receiving layer of the second medium.

4. An improved xerographic printing process of the class wherein a latent electrostatic image is formed on an electrically insulative surface, developed, and transferred onto a record medium, the improved process being characterized in that it provides the capability of forming a latent, electrostatic image derived from first and second complementary sources of information, the improved process including the steps of:
(a) imaging a light pattern representative of the information from the first source onto a first photoreceptive medium, the first photoreceptive medium being formed of an electrically conductive base layer and a photoconductive receiving layer having the property of persistent conductivity, to form a conductive image of the information from the first source;
(b) transferring and transforming the conductive image from the first photoreceptive medium onto a second photoreceptive medium in the form of an electrostatic image of the conductive image, the second photoreceptive medium being formed of an electrically conductive base layer and a photoconductive receiving layer; and
(c) imaging a light pattern representative of the information from the complementary second source onto the second photoreceptive medium to form a composite electrostatic image.

5. The method of claim 4, wherein the information from the second source is imaged onto the second photoreceptive medium by modulating the intensity of a scanning laser beam incident on the second photoreceptive medium.

6. The method of claim 4, wherein step (b) comprises the steps of:
 i. bringing the photoconductive receiving layer of the first photoreceptive medium into intimate relation with the photoconductive receiving layer of the second photoreceptive medium;
 ii. impressing a voltage between the conductive layers associated with the first and second media, the voltage being of sufficient magnitude to cause breakdown in air; and
 iii. separating the first and second media to define an air gap for the flow of discharge current from the photoconductive receiving layer of the first medium to the photoconductive receiving layer of the second medium.

7. Apparatus for xerographically printing a composite record of information derived from first and second complementary sources of information comprising:

first imaging means for forming a light pattern representative of information from the first source;

first photoconductive means, responsive to the light pattern representative of information from the first source, for forming a conductive image of such information;

second photoconductive means for supporting a latent electrostatic image;

image transfer means for transferring the conductive image from the first photoconductive means and transforming it into a corresponding latent electrostatic image on the second photoconductive means;

second imaging means for forming a light pattern representative of information from the second source and imaging such light pattern onto the second photoconductive means to form a corresponding latent electrostatic image thereon;

image development means for developing the resultant electrostatic image on the second photoconductive means; and image removal means for removing a developed image from the second photoconductive means and placing it onto a record medium.

8. The xerographic printing apparatus as recited in claim 7, wherein the first photoconductive means includes an image receiving surface formed of a photoconductive material having the property of persistent conductivity.

9. The xerographic printing apparatus as recited in claim 7, wherein the image transfer means is defined to include, transport means for first bringing the first photoconductive means into intimate relation with the second photoconductive means, and then for separating them to introduce an air gap therebetween, and voltage means for impressing a voltage between the first and second photoconductive means, the voltage being of sufficient magnitude to cause breakdown in air and provide for discharge current to flow between the photoconductive means to transform the conductive image of the first photoconductive means into a charge pattern representing a corresponding electrostatic latent image on the second photoconductive means.

10. The xerographic printing apparatus as recited in claim 9 wherein, the first photoconductive means comprises an endless belt having a base layer formed of electrically conductive material and a photoreceptive layer formed of a photoconductor characterized by persistent conductivity, the transport means comprises roller means, having mounted thereon the endless belt, for rotationally transporting the belt in conveyor-like fashion, and the second photoconductive means comprises a cylindrical body having a photoreceptive surface formed of a photoconductor on its circumferential surface, the first and second photoconductive means being disposed in intimate tangential relation with one another.

11. The xerographic printing apparatus as recited in claim 7, wherein the second imaging means is defined to include, laser means for directing a laser beam onto the second photoconductive means, and control means for controlling the intensity of the laser beam in accordance with information from the second source to form an electrostatic representation thereof on the second photoconductive means.

12. The xerographic printing apparatus as recited in claim 11, wherein the laser means comprises a Helium-Neon (HeNe) laser.

13. The xerographic printing apparatus as recited in claim 11, wherein the second source of information is a digital computer, and the control means is adaptable to receive the digital signal outputs of the computer.

14. An improved xerographic printing system of the class wherein an electrostatic image representative of an informational source is formed on a photoconductive surface, developed, and then transferred onto a medium to form a record thereof, the improved system being characterized in that it provides the capability of forming a latent, electrostatic image derived from first and second complementary sources of information, the improvement comprising:

first imaging means for forming a light pattern representative of information from the first source;

first photoconductive means, responsive to the light pattern representative of information from the first source, for forming a conductive image of such information;

second photoconductive means for supporting a latent electrostatic image;

image transfer means for transferring the conductive image from the first photoconductive means and transforming it into a corresponding latent electrostatic image on the second photoconductive means; and second imaging means for forming a light pattern representative of information from the second source and imaging such light pattern onto the second photoconductive means to form a corresponding latent electrostatic image thereon, which image forms a part of an overall composite image based on information from the first and second information sources.

15. The xerographic printing apparatus as recited in claim 14, wherein the first photoconductive means includes an image receiving surface formed of a photoconductive material having the property of persistent conductivity.

16. The xerographic printing apparatus as recited in claim 14, wherein the imgage transfer means is defined to include, transport means for first bringing the first photoconductive means into intimate relation with the second photoconductive means, and then for separating them to introduce an air gap therebetween, and voltage means for impressing a voltage between the first and second photoconductive means, the voltage being of sufficient magnitude to cause breakdown in air and provide for discharge current to flow between the photoconductive means to transform the conductive image of the first photoconductive means into a charge pattern representing a corresponding electrostatic latent image on the second photoconductive means.

17. The xerographic printing apparatus as recited in claim 16 wherein, the first photoconductive means comprises an endless belt having a base layer formed of electrically conductive material and a photoreceptive layer formed of a photoconductor characterized by persistent conductivity, the transport means comprises roller means, having mounted thereon the endless belt, for rotationally transporting the belt in conveyor-like fashion, and the second photoconductive means comprises a cylindrical body having a photoreceptive surface formed of a photoconductor on its circumferential surface, the first and second photoconductive means being disposed in intimate tangential relation with one another.

18. The xerographic printing apparatus as recited in claim 14, wherein the second imaging means is defined to include, laser means for directing a laser beam onto the second photoconductive means, and control means fo controlling the intensity of the laser beam in accordance with information from the second source to form an electrostatic representation thereof on the second photoconductive means.

19. The xerographic printing apparatus as recited in claim 18, wherein the laser means comprises a Helium-Neon (HeNe) laser.

20. The xerographic printing apparatus as recited in claim 18, wherein the second source of information is a digital computer, and the control means is adaptable to receive the digital signal outputs of the computer.

* * * * *